US010641423B2

(12) United States Patent
Pappalardo

(10) Patent No.: US 10,641,423 B2
(45) Date of Patent: May 5, 2020

(54) ADAPTERS FOR CONNECTING A SEPARATED-OUTLET FLUID CARTRIDGE TO A SINGLE-INLET MIXER, AND RELATED METHODS

(71) Applicant: NORDSON CORPORATION, Westlake, OH (US)

(72) Inventor: Matthew E. Pappalardo, Ewing, NJ (US)

(73) Assignee: Nordson Corporation, Westlake, OH (US)

( * ) Notice: Subject to any disclaimer, the term of this patent is extended or adjusted under 35 U.S.C. 154(b) by 566 days.

(21) Appl. No.: 15/177,957

(22) Filed: Jun. 9, 2016

(65) Prior Publication Data

US 2017/0356582 A1      Dec. 14, 2017

(51) Int. Cl.
*F16L 37/56* (2006.01)
*B05C 17/005* (2006.01)
(Continued)

(52) U.S. Cl.
CPC ........ *F16L 37/56* (2013.01); *B05C 17/00506* (2013.01); *B05C 17/00553* (2013.01); *F16L 37/0848* (2013.01); *F16L 47/20* (2013.01)

(58) Field of Classification Search
CPC ....... F16L 37/56; F16L 47/20; F16L 37/0848; F16L 37/133; F16L 37/098; B05C 17/00553; B05C 17/00506
(Continued)

(56) References Cited

U.S. PATENT DOCUMENTS

| 1,282,134 | A | * | 10/1918 | Stanley | .................... F16L 37/56 |
| | | | | | 285/26 |
| 3,944,261 | A | * | 3/1976 | Reed | ...................... A61M 39/10 |
| | | | | | 285/21.2 |

(Continued)

FOREIGN PATENT DOCUMENTS

| DE | 3529052 A1 * | 2/1987 | ............ F16L 37/098 |
| DE | 3605016 A1 * | 8/1987 | .............. F16L 37/00 |

(Continued)

OTHER PUBLICATIONS

ISA/220—Notification of Transmittal or Search Report and Written Opinion of the ISA, or the Declaration dated Sep. 7, 2017 for WO Application No. PCT/US17/035432.
(Continued)

*Primary Examiner* — Anna M Momper
*Assistant Examiner* — James A Linford
(74) *Attorney, Agent, or Firm* — Baker & Hostetler LLP

(57) ABSTRACT

An adapter for connecting a separated-outlet fluid cartridge to a single-inlet static mixer includes a lock mechanism and a lock release mechanism. The adapter includes a connection portion that engages the mixer. The lock mechanism has at least one snap arm that lockingly engages the cartridge in a snap fit manner so as to secure the adapter to the cartridge in fluid communication. When in the locked position, separate fluids are evacuated from the cartridge into the mixer where they are mixed prior to dispensing. The lock release mechanism quickly and easily unlocks the at least one snap arm from the cartridge for allowing a user to separate the adapter from the cartridge. The adapter sealing engages with both the mixer and the cartridge so that fluid flowing from the cartridge to the mixer does not leak.

21 Claims, 10 Drawing Sheets

(51) Int. Cl.
*F16L 37/084* (2006.01)
*F16L 47/20* (2006.01)

(58) Field of Classification Search
USPC .................. 285/124.3, 124.2, 124.1
See application file for complete search history.

(56) References Cited

U.S. PATENT DOCUMENTS

| | | | | |
|---|---|---|---|---|
| 4,981,241 A | * | 1/1991 | Keller | A61M 5/19 222/137 |
| 7,940,935 B2 | | 5/2011 | Nakahara et al. | |
| 2006/0071019 A1 | * | 4/2006 | Engelbrecht | B05C 17/00506 222/94 |
| 2011/0121035 A1 | * | 5/2011 | Greter | A61C 9/0026 222/145.1 |
| 2017/0297049 A1 | | 10/2017 | Buck et al. | |

FOREIGN PATENT DOCUMENTS

| | | | | |
|---|---|---|---|---|
| DE | 202006004738 U1 | | 6/2006 | |
| EP | 0603033 A1 | * | 6/1994 | ............ F16L 37/133 |
| EP | 2407249 A1 | | 1/2012 | |
| EP | 2724789 A1 | * | 4/2014 | ....... B05C 17/00586 |
| EP | 2727655 A1 | * | 5/2014 | ....... B05C 17/00506 |
| FR | 863447 A | * | 4/1941 | ............. F16L 37/12 |
| WO | 2006/046099 A2 | | 5/2006 | |
| WO | 2016/046099 A1 | | 3/2016 | |

OTHER PUBLICATIONS (IPEA/409) International Preliminary Report on Patentability Chapter II or (IB/373) International Preliminary Report on Patentability Chapter I dated Dec. 20, 2018 for WO Application No. PCT/US17/035432.

* cited by examiner

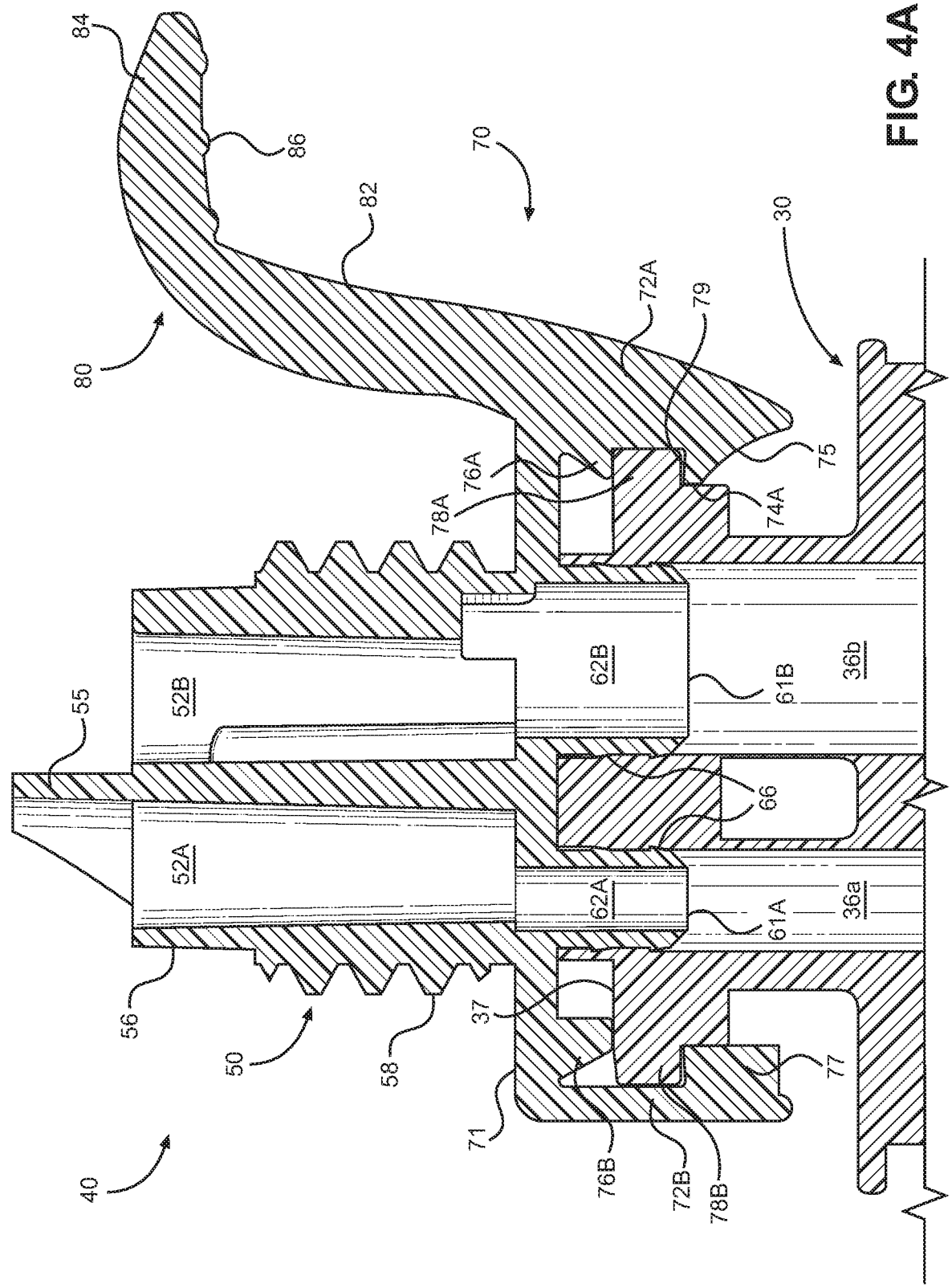

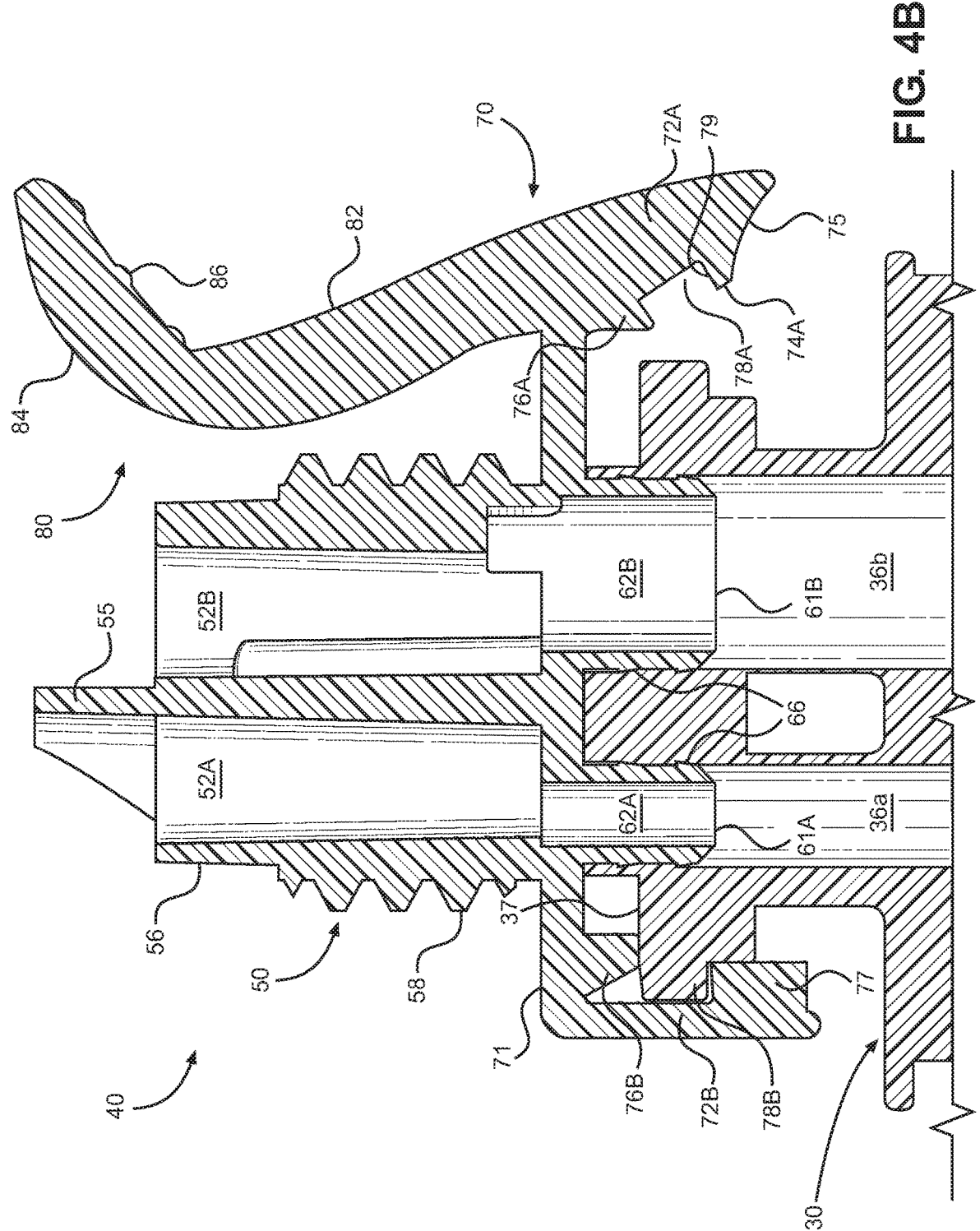

ADAPTERS FOR CONNECTING A SEPARATED-OUTLET FLUID CARTRIDGE TO A SINGLE-INLET MIXER, AND RELATED METHODS

TECHNICAL FIELD

This disclosure relates generally to fluid dispensers, and more particularly, to adapters and methods for connecting mixers to fluid cartridges in a locking manner.

BACKGROUND

In the dispensing field, it is common practice to manufacture and ship fluid cartridges holding fluid to be dispensed separately from static mixers for mixing the fluid. There are various reasons for this practice, including, but not limited to, the extensive length of some mixer/cartridge combinations when connected, and the desire to use a plurality of different mixers with a particular cartridge. Consequently, mixers and cartridges are often provided with connection elements that facilitate secure coupling of a mixer to a cartridge.

A common type of cartridge used in the dispensing field is a multi-component (or "side-by-side") cartridge having two or more separate chamber portions each adapted to contain a respective fluid. Such cartridges often include separated first and second fluid outlet members that are coupled to separated first and second fluid inlet members of a mixer when the mixer is attached to the cartridge. Such cartridges and mixers may be referred to as "separated-outlet" cartridges and "separated-inlet" mixers, respectively, or more generally as "separated-bore" dispensing components. Further, such cartridges and mixers often include bayonet-style connection elements. For example, the mixer may include a pair of bayonet lugs, and the cartridge may include one or more locking channels that receive and lockingly engage the bayonet lugs when the mixer is rotated relative to the cartridge.

In addition to separated-bore dispensing components, non-separated-bore components, also referred to as "single-bore" or "single-inlet" components, for example, are also commonly used in the dispensing field. A single-inlet, or single-bore, mixer generally includes a single fluid inlet rather than separated first and second fluid inlet members, and thus is designed for use with a cartridge having a single fluid outlet member. Users of dispensing components often maintain inventories of separated-bore dispensing components and/or single-bore dispensing components. For such users, it may be desirable for various business and product quality reasons to use single-bore mixers (i.e., single-inlet mixers) with separated-bore cartridges. However, the structural differences between single-bore mixers and separated-bore cartridges generally inhibit their use together. Accordingly, there is a need for a mechanism that enables use of single-inlet (i.e., single-bore) mixers with separated-outlet (i.e., separated-bore) cartridges.

SUMMARY

According to the present disclosure, an adapter is provided for connecting a separated-outlet cartridge containing a fluid to a mixer configured to mix and dispense the fluid. The adapter includes a fluid outlet port, a pair of fluid inlet ports, at least one lock mechanism and at lease one corresponding lock release mechanism. The fluid outlet port has an outer connection portion configured to be coupled to the mixer for directing fluid into the mixer, and the pair of fluid inlet ports is configured to be releasably coupled to the separated-outlet cartridge for receiving fluid from the cartridge. It should be appreciated that the outer connection portion of the fluid outlet port can be releasably or non-releasably coupled to the mixer. The fluid inlet ports are further adapted to be in fluid communication with the fluid outlet port.

The fluid inlet ports are configured to be coupled to respective fluid outlets of the cartridge for receiving fluid from the cartridge. The fluid outlet port further comprises a first fluid outlet passage and a second fluid outlet passage separated by a partition, such as a flat or curved dividing wall. These first and second fluid outlet passages may be equal in size for directing equal volumes of respective first and second fluids into the mixer. Alternatively, the first and second fluid outlet passages may be unequal in size for directing unequal volumes of respective first and second fluids into the mixer. The outer connection portion of the adapter is further configured to be sealingly coupled to the mixer. This can be accomplished, for example, by a threading engagement or a press-fit seal. For instance, the outer connection portion may comprise at least one circumferential barb for facilitating such a press-fit seal.

The lock mechanism is configured to lockingly snap into engagement with the cartridge. The lock release mechanism is coupled to the lock mechanism and configured to unlock the adapter from the cartridge. Both the lock mechanism and the lock release mechanism may be integrally molded together as a unitary piece. In use, the lock release mechanism is movable between a locked position relative to the cartridge and an unlocked position relative to the cartridge.

The lock mechanism further comprises a base and at least one snap arm adapted to receive and lockingly engage a flange of the cartridge. The at least one snap arm extends substantially perpendicular to the base when in a locked position and extends obliquely away from the base when in an unlocked position. The at least one snap arm extends distally from the connection portion of the adapter and is resiliently movable between a locking position and an unlocking position. The at least one snap arm also comprises a locking notch configured to snap over a flange of the cartridge, wherein the at least one snap arm includes an inwardly projecting locking tab having an oblique trailing surface configured to abut the flange of the cartridge. Further, the locking tab defines a leading surface that is chamfered or rounded to assist with snapping said locking notch into engagement with the flange of the cartridge.

When assembling a fluid dispenser according to the present disclosure, a user aligns a connection portion of the adapter within a proximal end of the single-inlet mixer and engages the mixer with the adapter so as to inhibit proximal movement therebetween. The user also aligns a proximal portion of the adapter within a distal end of the separated-outlet cartridge and engages the cartridge with the adapter in a snap-fit manner so as to inhibit proximal movement therebetween. Thus, the adapter sealingly engages both the mixer and cartridge in a locking manner, and provides fluid communication between the cartridge and the mixer. It should be appreciated that the mixer may come pre-attached to the adapter for quick assembly with the cartridge. The lock release mechanism comprises a lever extending proximally from the lock mechanism, and a peel handle extending outwardly from the lever. The peel handle advantageously has a gripping surface to prevent it slipping from a user's grip during the unlocking process. To unlock the adapter from the cartridge, a user is able to easily and quickly peel back the handle, thus disengaging the at least one snap arm from the cartridge flange. The adapter of the present disclosure also advantageously allows a user to take its existing supply of threaded and single seal mixers and convert them to separated bore mixers.

Various advantages, features and functions of the present disclosure will become readily apparent and better understood in view of the following description and accompanying drawings. The following description is not intended to limit the scope of the present disclosure, but instead merely details exemplary aspects for ease of understanding.

BRIEF DESCRIPTION OF THE DRAWINGS

FIGS. 4A-B are side cross-sectional views of the adapter of FIG. 3, taken along line 4-4. FIG. 4A shows that adapter locked to the fluid cartridge. FIG. 4B shows that adapter unlocked from the fluid cartridge.

It should be noted that the figures are not necessarily drawn to scale, but instead are drawn to provide a better understanding of the components thereof, and are not intended to be limiting in scope, but rather to provide exemplary illustrations.

DETAILED DESCRIPTION

Figure 1:
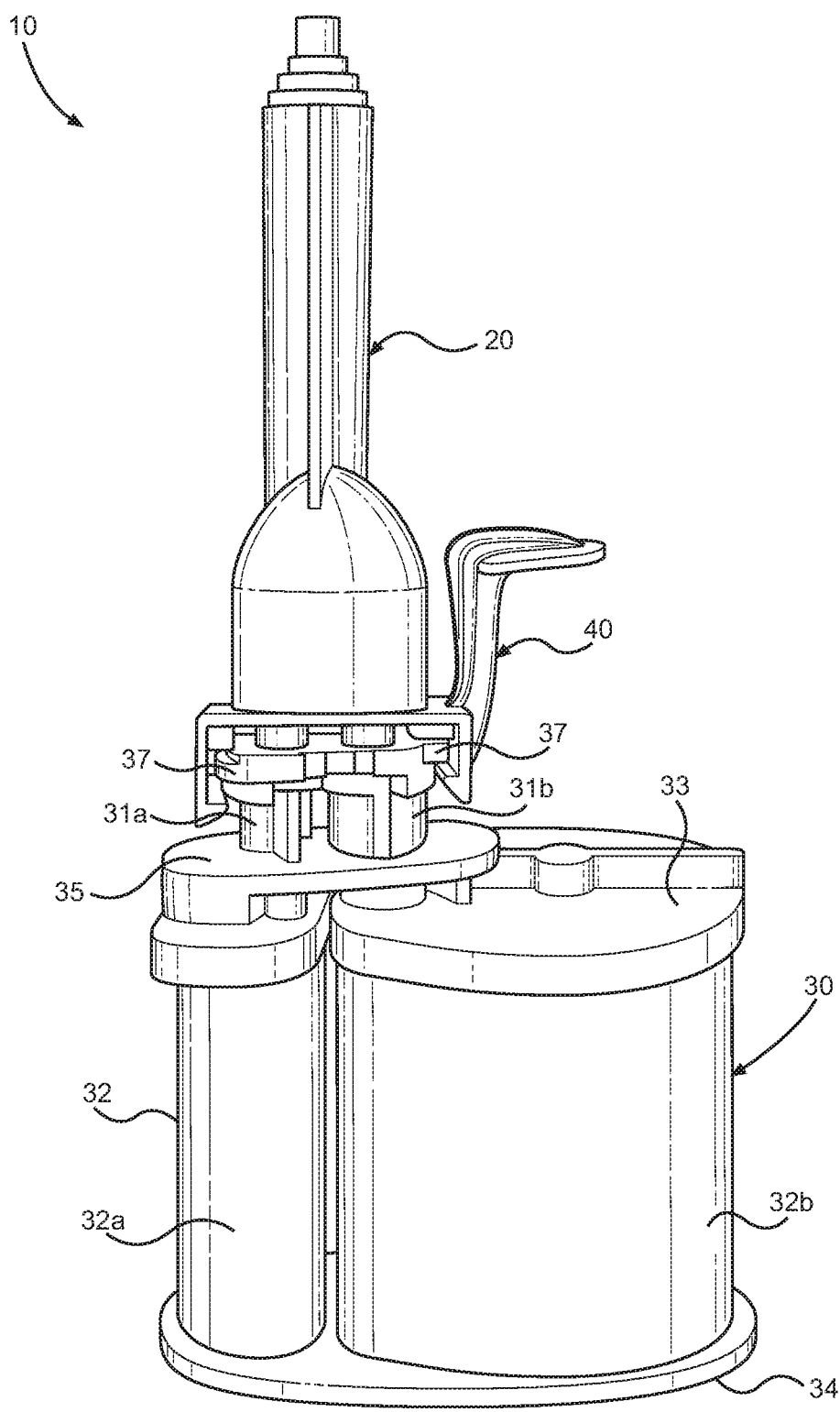
FIG. 1 is a perspective view of an assembled dispensing assembly including a separated-outlet fluid cartridge, a single-inlet mixer, and an adapter for connecting the cartridge to the mixer according to an aspect of the present disclosure.
Figure 2:
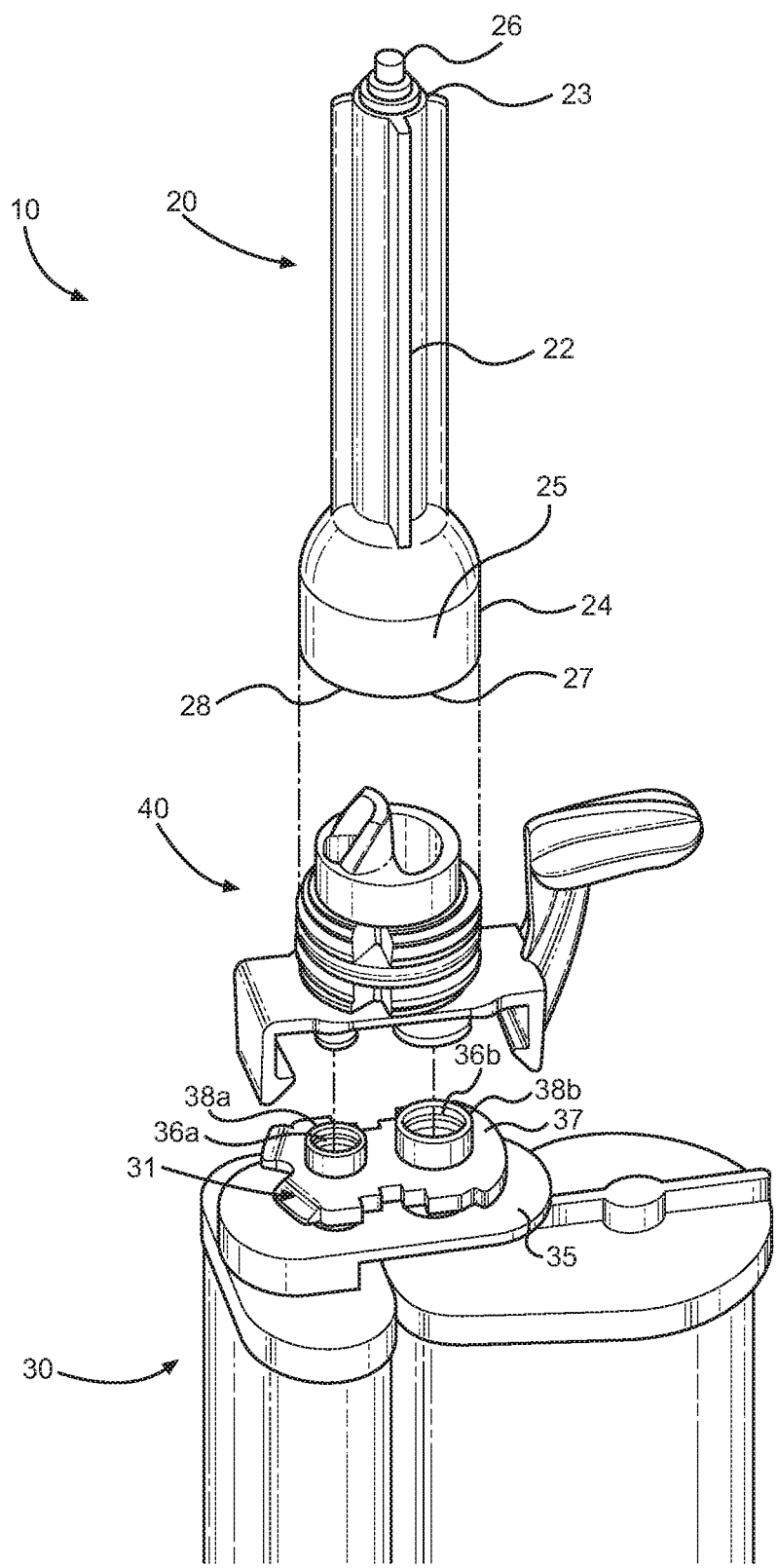
FIG. 2 is a perspective view of the dispensing assembly of FIG. 1, shown disassembled.

A dispensing assembly 10 is shown in FIGS. 1 and 2. The dispensing assembly 10 generally includes a single-inlet static mixer 20, a separated-outlet cartridge 30, and an adapter 40 that releasably couples the static mixer 20 with the cartridge 30. The adapter 40 advantageously enables use of a single-inlet static mixer 20 with a separated-outlet cartridge 30 for dispensing operations, whereas such mixers and cartridges are otherwise generally incompatible with one another. Moreover, the adapter 40 lockingly engages the static mixer 20, such as through a snap-fit or threaded engagement, and selectively and releasably engages the cartridge 30, such as through a snap-fit engagement. The static mixer 20 and adapter 40 may be preassembled and shipped to users for attachment to, and use with, existing supplies of separated-outlet cartridges, such as cartridge 30, or provided separately and assembled by the user.

As used herein in connection with separated-outlet cartridge 30, the terms "separated-outlet," "separated-inlet," and "separated-bore" refer to dispensing components having first and second fluid outlet/inlet members (also referred to as "ports"), each defining a respective fluid outlet/inlet passage and having a respective sealing surface for sealingly engaging a corresponding fluid inlet/outlet member of another dispensing component. As described in greater detail below, separated-outlet cartridge 30 includes a first fluid outlet member 31a defining a first fluid outlet passage 36a and having a first fluid outlet inner sealing surface 38a, and a separate second fluid outlet member 31b defining a second fluid outlet passage 36b and having a second fluid outlet inner sealing surface 38b.

Further, as used herein in connection with single-inlet static mixer 20, the terms "single-inlet" and "single-bore" refer to dispensing components having a single fluid inlet or bore defining a corresponding single fluid passage and having a single sealing surface for sealingly engaging a corresponding member of another dispensing component. As described in greater detail below, the single-inlet static mixer 20 includes a single fluid inlet 27 defining a single fluid inlet passage 28 and having a single fluid inlet sealing surface 29.

Still referring to FIGS. 1 and 2, the separated-outlet cartridge 30 includes a fluid chamber 32 that extends between a distal end 33 and a proximal end 34 of the cartridge 30. The fluid chamber 32 includes a first fluid chamber portion 32a and a second fluid chamber portion 32b arranged adjacent to one another. The fluid chamber portions 32a, 32b are configured to contain first and second fluids, respectively, to be mixed together before dispensing, such as two reactive components that mix to form an adhesive material or other reactive two-component material.

Although the first and second fluid chamber portions 32a, 32b are shown with differing sizes in the Figures, it will be understood that the first and second fluid chamber portions may be the same size, or resized relative to one another in other variations consistent with the present disclosure. Moreover, the fluid chamber 32 may include more or fewer fluid chamber portions according to other aspects of the disclosure without departing from the scope of the application. As understood in the dispensing field, the proximal end 34 of the cartridge 30 is configured to receive an actuator (not shown) such as a pneumatically or mechanically actuated piston or plunger for pushing the fluids out of the fluid chamber 32 and into the static mixer 20.

The distal end 33 of the separated-outlet cartridge 30 includes an outlet socket 31 configured to connect to a separated-inlet mixer (not shown). The outlet socket 31 includes a base flange 35, as well as a first fluid outlet member 31a and a second fluid outlet member 31b (also referred to as outlet "ports") extending distally from the base flange 35 and arranged adjacent to each other. The first fluid outlet member 31a defines a first fluid outlet passage 36a that communicates with the first fluid chamber portion 32a, and which has a first inner sealing surface 38a. The second fluid outlet member 31b defines a second fluid outlet passage 36b that communicates with the second fluid chamber portion 32b, and which has a second inner sealing surface 38b. While the fluid outlet members 31a, 31b are shown as different sized tubular members having substantially circular cross-sectional shapes, it will be appreciated that the fluid outlet members may be formed with various alternative shapes and with various alternative sizing.

The outlet socket 31 further includes a planar retaining flange 37 circumferentially provided on the first and second fluid outlet members 31a, 31b and extending radially outward therefrom such that the retaining flange overhangs the base flange 35. The retaining flange 37 is thus configured to lockingly engage the adapter 40, as will be described in further detail below.

The single-inlet static mixer 20 includes a mixer housing 22 extending between a proximal end 24 having a connection portion 25 and a distal end 23 having a dispensing tip 26. The inner connection portion 25 includes an inner threaded surface and an adjacent inner sealing surface. The mixer housing 22 generally houses a mixing element (not shown) having one or more known mixing baffles of various types for rotating and combining one or more fluids together as the fluid(s) traverse the length of the mixer housing. The mixer 20 further includes a single fluid inlet 27 defining a single fluid inlet passage 28 that opens to a central bore in which the mixing element (not shown) is arranged.

The adapter 40 is configured to connect the single-inlet mixer 20 to the separated-outlet fluid cartridge 30. While the adapter 40 is shown in use with static mixer 20 and fluid cartridge 30, each having specific structural features, it should be appreciated that the adapter 40 may be suitably modified for use with single-inlet mixers and separated-outlet cartridges of various alternative types without departing from the scope of the present disclosure.

Figure 3:
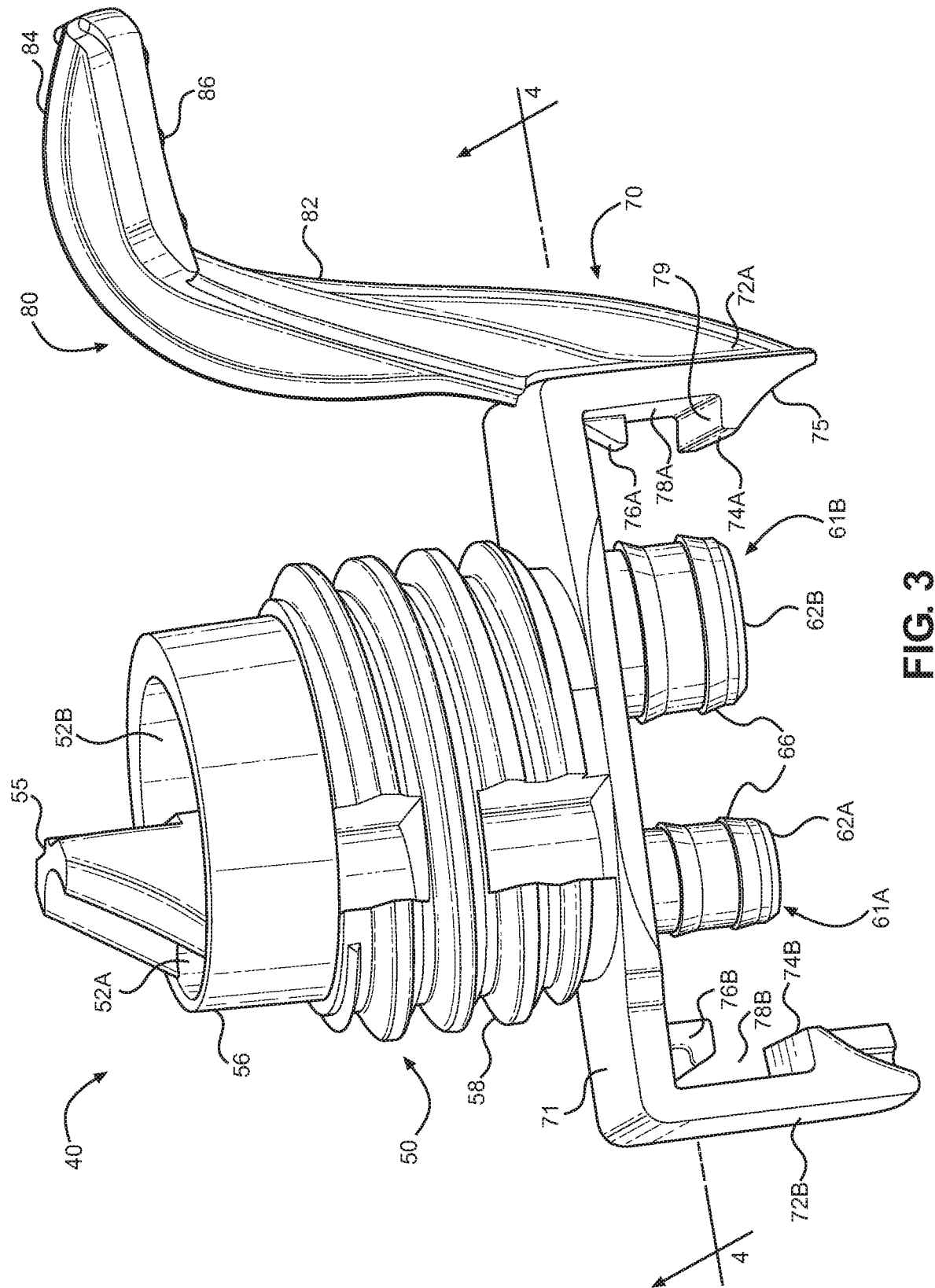
FIG. 3 is a perspective view of the adapter shown in FIG. 1.

Referring to FIGS. 3 and 4, the adapter 40 includes a fluid outlet member 50 (also referred to as outlet "port") having an outer connection portion configured to sealingly and releasbly engage the mixer 20. The outer connection portion includes an outer sealing surface 56 and an adjacent outer threaded surface 58. The fluid outlet port 50 is configured to be received within the fluid inlet 27 of the mixer 20 such that the outer sealing surface 56 of the fluid outlet port sealingly engages the inner sealing surface of the static mixer 20, thereby forming a liquid-tight seal. Moreover, the outer threaded surface 58 threadingly engages the inner threaded surface 25 of the mixer, thereby threadingly connecting the mixer to the adapter, for example, in a releasable manner. The fluid outlet member 50 defines a first fluid outlet passage 52a and a second fluid outlet passage 52b that are separated by a dividing wall 55, which may be straight or curved. The first and second fluid outlet passages 52a, 52b are in fluid communication with the single fluid inlet passage 28 of the mixer 20 when the adapter is connected thereto.

The adapter further includes a first fluid inlet member 61a (also referred to as inlet "port") and a second fluid inlet member 61b adapted to sealingly and releasably engage the cartridge 30. The first and second fluid inlet ports 61a, 61b are configured to be received within the respective first and second fluid outlet members 31a, 31b of the cartridge. Moreover, each of the first and second fluid inlet ports 61a, 61b can include respective outer sealing surfaces having at least one sealing member, such as a barb 66, to sealingly engage the respective inner sealing surfaces 38a, 38b of the first and second fluid outlet ports 31a, 31b of the cartridge, thereby forming a liquid-tight seal when the adapter is connected to the cartridge. The first fluid inlet member 61a defines a first fluid inlet passage 62a, and the second fluid inlet member 61b defines a second fluid inlet passage 62b, wherein the first and second fluid outlet passages 52a, 52b of the fluid outlet port 50 are in fluid communication with the respective first and second fluid inlet passages 62a, 62b of the corresponding first and second fluid inlet ports 61a, 61b.

It should be appreciated that either, or both, of the first and second fluid outlet passages 52a, 52b may be formed with a circular cross-sectional shape or a non-circular cross-sectional shape, such as an oblong or cat-eye shape. Further, each of the fluid outlet and inlet members 50, 61a, 61b of the adapter may be substantially cylindrical in shape. However, it will also be appreciated that the fluid outlet and inlet members 50, 61a, 61b may be formed with various alternative shapes. Further, the fluid outlet passages 52a, 52b of the adapter 40, may be differently sized to deliver alternative ratios of first fluid to second fluid into the static mixer 20. Similarly, the first and second fluid inlet passages 62a, 62b may be sized differently to receive alternative ratios of first fluid to second fluid from the cartridge 30.

Figure 5:
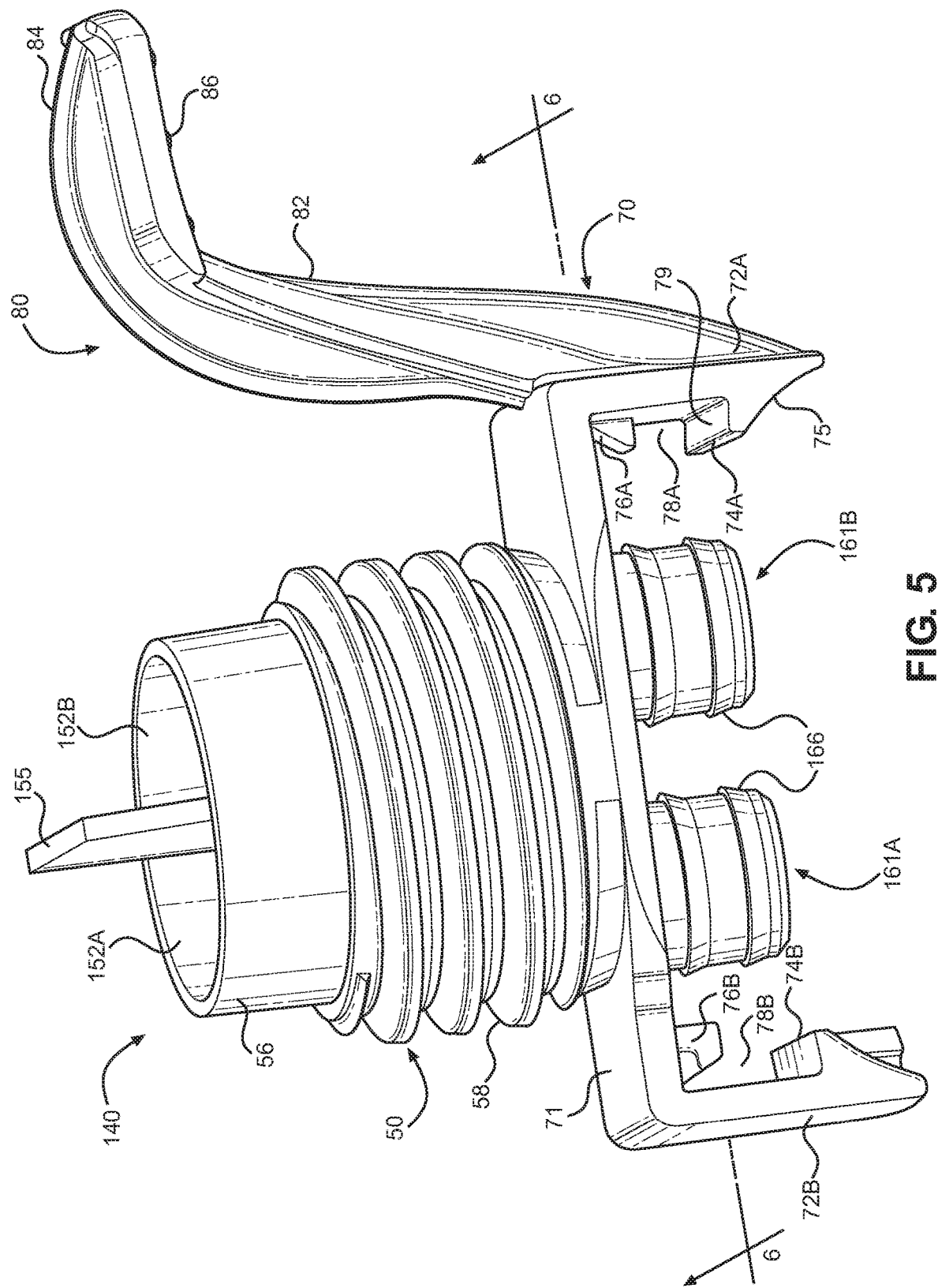
FIG. 5 is a perspective view of another adapter according to the present disclosure.
Figure 6:
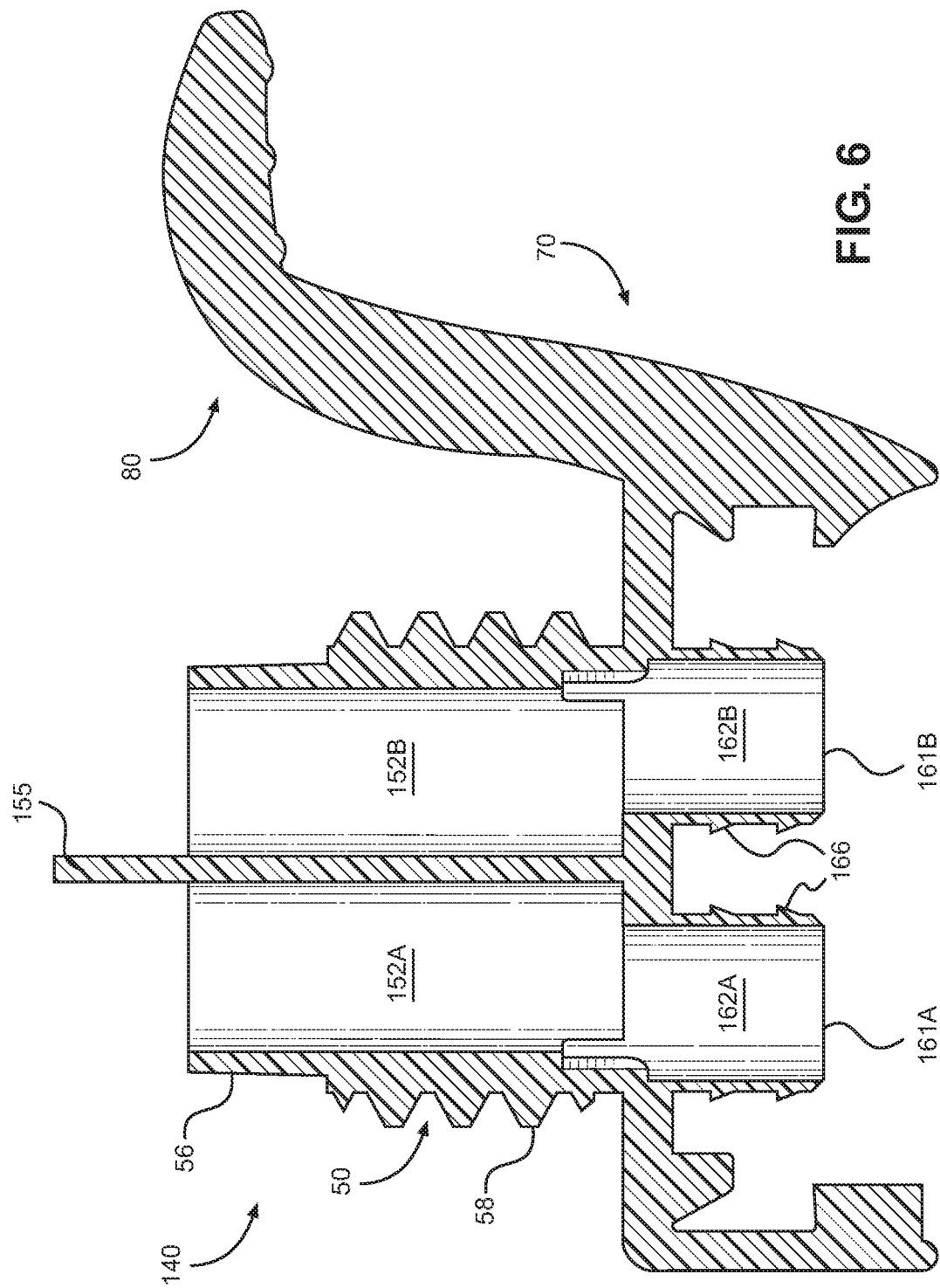
FIG. 6 is a side cross-sectional view of the adapter of FIG. 5, taken along line 6-6.

In another aspect, for example as shown in FIGS. 5 and 6, the fluid outlet passages 152a, 152b of the adapter may be substantially equal in size, and the fluid inlet passages 162a, 162b may also be substantially equal in size, i.e., have the same cross-sectional area, for directing substantially equal volumes of respective first and second fluids from the first and second chamber portions 32a, 32b of the fluid cartridge 30 into the static mixer 20. In other words, the first and second fluid outlet passages 152a, 152b, may be equally sized to deliver a 1:1 volume ratio of first fluid to second fluid into the static mixer 20. Similarly, the first and second fluid inlet passages 162a, 162b, may be equally sized to receive a 1:1 volume ratio of first fluid to second fluid from the cartridge 30.

Referring again to FIGS. 3 and 4, the adapter 40 is further provided with a lock mechanism 70 for lockingly engaging the separated-outlet fluid cartridge 30, thereby facilitating coupling of the cartridge with the single-inlet static mixer 20. A lock release mechanism 80 is coupled to the lock mechanism for unlocking the adapter from the cartridge.

Advantageously, the adapter lock mechanism 70 is operable to snap into and out of engagement with a corresponding retaining flange 37 or wall on the cartridge 30. The lock mechanism 70 extends distally from the fluid outlet member 50 and is configured to snap into and out of engagement with the retaining flange 37 of the cartridge 30. As a result of this snap engagement between the adapter 40 and the cartridge 30, these components may be attached and removed from one another quickly and easily with a simple peeling and/or pulling movement of the lock release mechanism 80.

The lock mechanism 70 includes a base portion 71 provided between the fluid outlet port 50 and the first and second fluid inlet ports 61a, 61b. A first snap arm 72a and a spaced apart second snap arm 72b extend distally from opposite ends of the base portion 71 in a substantially perpendicular direction relative to the base portion. Each snap arm 72a, 72b is configured to engage the retaining flange 37 of the cartridge in a snap-fit manner, for example, by sliding over the retaining flange as will be described in greater detail below. The first snap arm 72a includes a substantially perpendicular first locking tab 74a, and the second snap arm 72b includes a substantially perpendicular second locking tab 74b, wherein the first and second locking tabs 74a, 74b extend in a direction toward each other. Further, the first snap arm 72a also includes a first locking rib 76a, and the second snap arm 72b includes a second locking rib 76b. The first and second locking tabs 74a, 74b together with the corresponding first and second locking ribs 76a, 76b define respective first and second locking notches 78a, 78b that are adapted to receive the retaining flange 37 of the cartridge. These notches may be formed as recesses or channels, and are adapted to accommodate the correspondingly shaped features projecting from the cartridge.

The lock release mechanism 80 includes a proximally and outwardly extending lever 82 coupled to the lock mechanism 70. In particular, the lever 82 includes a first end coupled to the first snap arm 72a, and a second end coupled to a peel handle 84. A gripping surface 86 is provided on the peel handle 84 to facilitate gripping thereof so as to prevent it from slipping out of a user's grasp during the unlocking operation. It should be further appreciated that the lock mechanism may include a second lever coupled thereto. For example, the second lever may be coupled to the second snap arm so unlocking the adapter from the cartridge is carried out by manipulating both the first and second levers in a peeling manner.

The base 71 advantageously projects from diametrically opposed sides of the fluid outlet 50, such that the base 71 can fit over the first and second fluid outlet members 31*a*, 31*b* of the cartridge when the adapter is lockingly coupled to the cartridge. As shown in FIG. 4A, each of the first and second locking tabs 74*a*, 74*b* is positioned on a free end of the respective first and second snap arms 72*a*, 72*b* on opposite ends of the base 71, and project radially inward from the snap arms. The locking tabs 74*a*, 74*b* are configured to snap over a opposite ends of the cartridge retaining flange 37, and the first and second locking notches 78*a*, 78*b* are configured to securely receive the corresponding opposite ends of the retaining flange. More particularly, the locking tabs 74*a*, 74*b* extend radially inward toward the fluid inlet ports 61*a*, 61*b* and substantially inhibit proximal movement of the adapter 40 relative to the cartridge 30 following assembly in the locking position.

The first and second locking tabs 74*a*, 74*b* are formed with an oblique trailing surface 79 to snugly engage or abut the cartridge flange 37. A leading surface 75 of the locking tabs may be chamfered or rounded as shown to facilitate movement of the locking tab and the snap arm over the cartridge flange. Similarly, the locking notches 78*a*, 78*b* may also be chamfered or rounded to assist with this movement of the lock mechanism 70. Therefore, the leading surface 75 helps the locking mechanism 70 slide over and engage the ends of the retaining flange 37 of cartridge. Other aspects of the precise appearance and contours defined by the lock mechanism may be modified without departing from the scope of the current disclosure. For example, it should also be appreciated that at least one of the snap arms, such as the second snap arm 72*b*, may include a leading surface having at least one reinforcement structure 77, such as a rib, in order to increase its rigidity.

The lock release mechanism 80 includes a lever 82 connected to the first snap arm 72*a* of the lock mechanism 70. The lever 82 is provided adjacent the base 71 and extends generally away from the lock mechanism 70 toward the mixer 20 when assembled. The peel handle 84 outwardly extends away from the lever 82 and defines a slightly arcuate profile along its length that includes a gripping surface 86 for a user's fingers to actuate movement of the lock mechanism 70. It will be appreciated that the contour or profile of the peel handle 84 may be modified according to other aspects of the disclosure, such as being generally planar or having at least one structural reinforcement member, such a rib, to increase its rigidity.

The peel handle 84 is configured to be peeled or pulled toward the fluid outlet member 50, or toward the mixer 20 when coupled to the adapter, to force slight pivoting of the first snap arm 72*a* away from the retaining flange 37 of the cartridge. The adapter may be formed of a suitably elastic and resilient material to allow the snap arms 72*a*, 72*b* to flex radially outward when passing over and engaging the cartridge retaining flange 37 during a locking operation. More particularly, the adapter 40 is formed by injection molding a plastic material such as polypropylene or nylon, which advantageously has enough elasticity to enable the slight pivoting of the first snap arm 72*a* at the base 71, and automatic return to the original shape after pivoting around the retaining flange 37 of the cartridge. The elasticity of the adapter allows the second snap arm 72*b* to be similarly pivotable at the base 71 for facilitating an unlocking operation.

In use, the adapter 40 is connected to the cartridge 30 by the following process. The first and second fluid inlet ports 61*a*, 61*b* of the adapter are aligned with the first and second fluid outlet ports 31*a*, 31*b* of the cartridge 30. From the aligned position, the adapter 40 and the cartridge 30 are moved toward one another such that the first and second snap arms 72*a*, 72*b* snap over opposing ends of the cartridge retaining flange 37 so as to become engaged in a locked position. As previously discussed, the rounding or chamfering of the leading surface 75 of the first and second locking tabs 74*a*, 74*b* assists with moving the snap arms over the retaining flange. More particularly, the leading surface 75 may be tapered radially inward so as to facilitate alignment and snap fit of the cartridge retaining flange within the adapter locking notches.

The first lock mechanism 70 operates to securely couple the adapter 40 and the cartridge 30 with a quick snap connection since the locking tabs extend radially inward to abut the retaining flange 37. The space between the first and second locking tabs 74*a*, 74*b* and the respective first and second locking ribs 76*a*, 76*b* defines the corresponding first and second locking notches 78*a*, 78*b*, which are sized to receive a portion of the cartridge retaining flange 37 with a snap fit engagement.

The fluid in the cartridge 30 may then be dispensed through the adapter 40 and into the mixer 20. Advantageously, the snap fit connection of the adapter snap arms onto the retaining flange of the cartridge helps maintain proper orientation of the first and second fluid inlet ports 61*a*, 61*b* of the adapter with respect to the first and second fluid outlet ports 31*a*, 31*b* of the cartridge 30. This is beneficial since the prevention of relative rotation between the adapter 40 and the cartridge 30 ensures that the respective fluid inlets 61*a*, 61*b* and fluid outlets 31*a*, 31*b* are not rotated during installation or removal of the adapter, thereby avoiding any potential cross contamination that may result when relative rotation occurs. This also eliminates common cross contamination problems that are typically associated with conventional connecting mechanisms.

When the mixing and dispensing operation is completed, the adapter 40 may be removed from the cartridge 30 in a similar manner as the snap-on connection. From the locked position, a user applies manual pressure on the gripping surface 86 of the peel handle 84 to pivot the lever 82 towards the fluid outlet member 50 (or the mixer 20 when assembled). This pulling of the peel handle 84 is shown in FIG. 4B and forces the first snap arm 72*a* and the first locking tab 74*a* of the lock mechanism 70 to pivot in an opposite direction away from engagement with the retaining flange 37 of the cartridge in the first locking notch 78*a*. From the unlocked position, the user can then freely pull the adapter 40 away from the cartridge 30 back to the disengaged position.

As with the connection process, the disconnection of the adapter 40 from the cartridge 30 requires no relative rotation of these components, and therefore reduces or eliminates the likelihood of cross contamination of fluids. Furthermore, the peel and snap off process for disengaging the adapter 40 from the cartridge 30 may be performed in a quick and easy manner, thereby reducing the amount of time necessary to assemble and disassemble the dispensing assembly 10. Moreover, as previously described, the adapter 40 and the cartridge 30 may each be formed by injection molding processes, thereby eliminating any tight tolerance problems.

Thus, the dispensing assembly 10 of this implementation improves upon conventional threaded or bayonet-style connection mechanisms.

Figure 7:
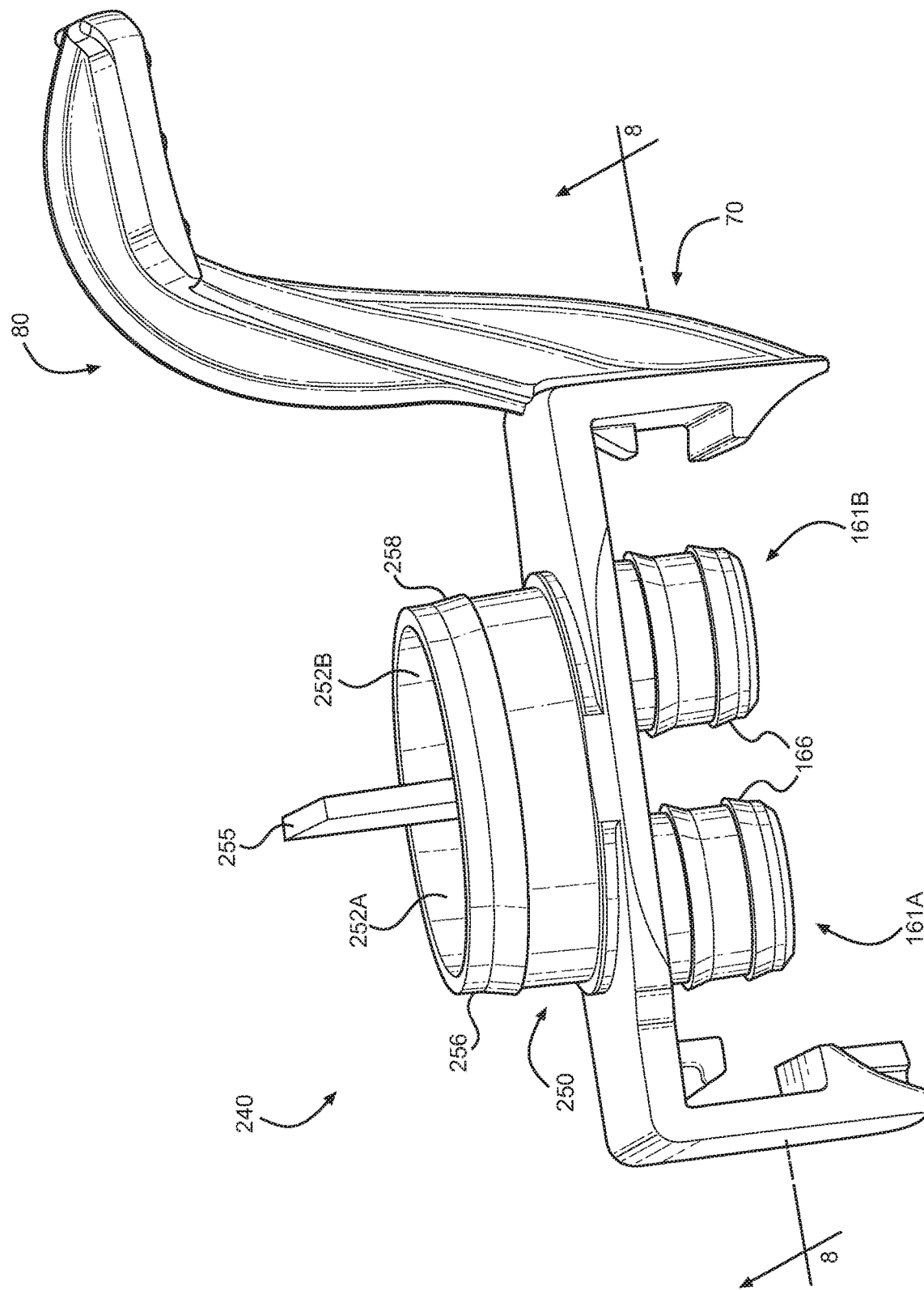
FIG. 7 is a perspective view of another adapter according to the present disclosure.
Figure 8:
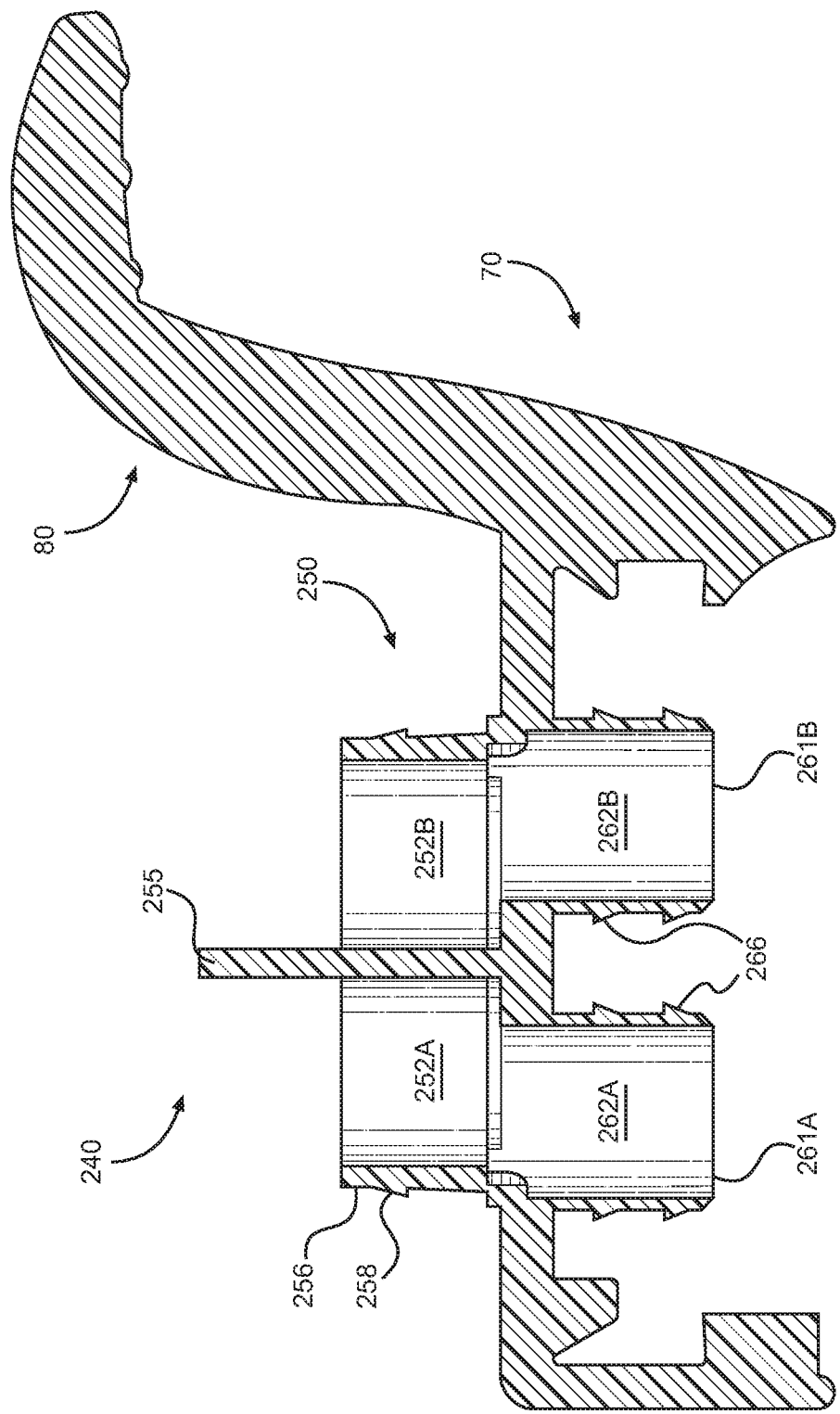
FIG. 8 is a side cross-sectional view of the adapter of FIG. 7, taken along line 8-8.

FIGS. 7 and 8 illustrate an aspect of the adapter 240 in which the fluid outlet passages 252a, 252b of the adapter are again substantially equal in size, and the fluid inlet ports 262a, 262b may also be substantially equal in size. This arrangement directs substantially equal volumes of respective first and second fluids from the first and second chamber portions of the fluid cartridge into the static mixer. The fluid outlet passages 252a, 252b partitioned by a flat dividing wall 255. The fluid outlet member 250 has an outer connection portion configured to sealingly engage the mixer 20. In particular, the outer connection portion includes an outer sealing surface 256 and at least one adjacent outer sealing member, such as a barb 66, to sealingly engage an inner connection portion of the mixer in a snap-fit manner, thereby forming a liquid-tight seal. It should be appreciated that this snap-fit connection can be configured to be releasable or non-releasable.

Figure 9:
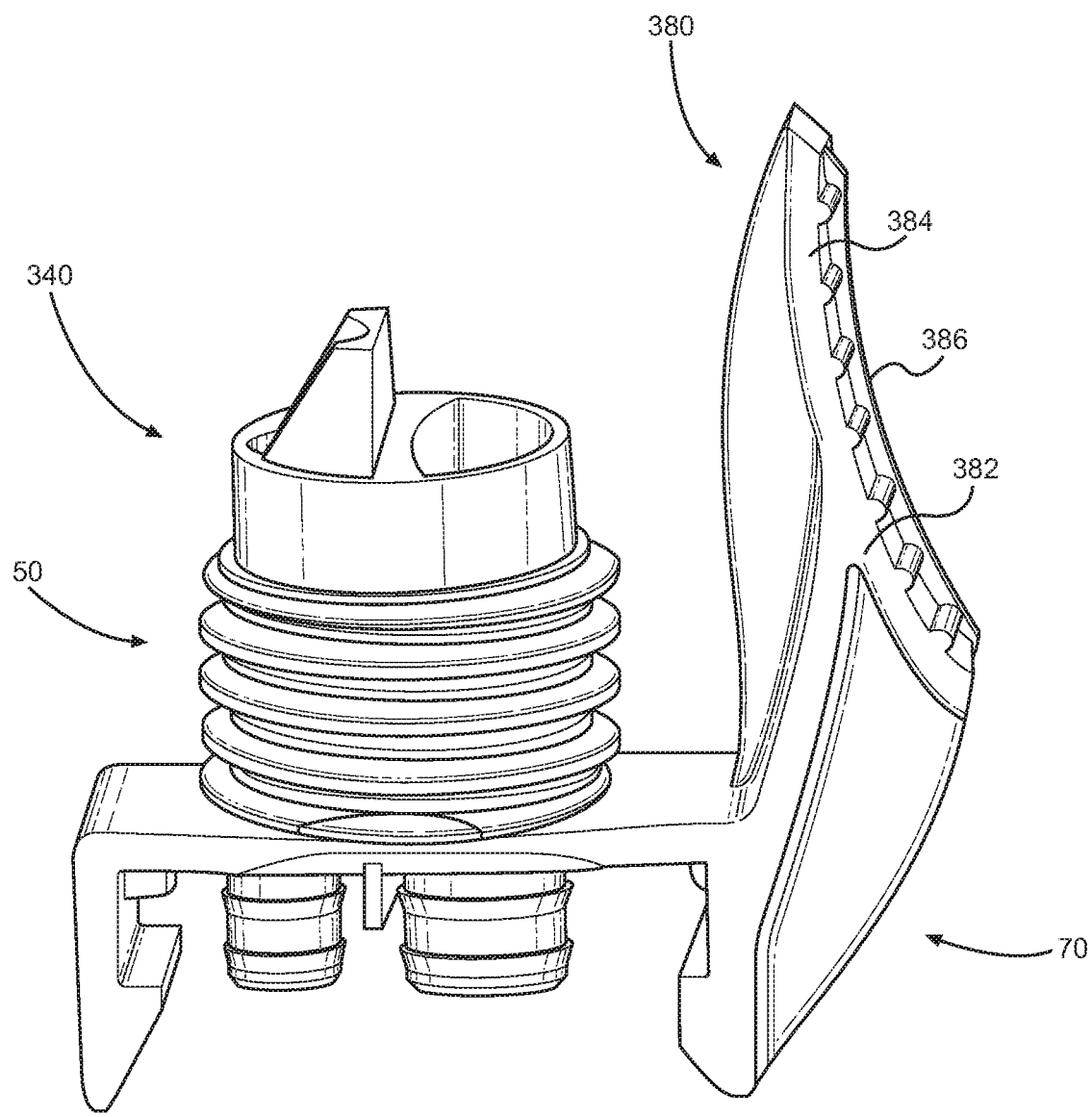
FIG. 9 is a perspective view of yet another adapter according to the present disclosure.

Another aspect of the disclosure is shown in FIG. 9, in which an adapter 340 has a lock release mechanism 380 having a lever 382 with a first end coupled to the lock mechanism 70. A second end of the lever is coupled to a squeeze handle 384 having a gripping surface 386. The squeeze handle 384 defines a slightly arcuate profile along its length and is configured to be squeezed by a user's fingers to actuate movement of the lock mechanism 70. Particularly, the squeeze handle 384 is squeezable toward the fluid outlet member 50, or toward the mixer 20 when coupled to the adapter, to force slight pivoting of the first snap arm 72a away from the retaining flange 37 of the cartridge due to the suitably elastic and resilient material that forms the adapter. Thus, squeezing the squeeze handle 384 operatively causes the snap arms 72a, 72b to flex radially outward to disengage the cartridge retaining flange 37 during an unlocking operation.

While the present disclosure has been illustrated by the description of specific embodiments thereof, and while the embodiments have been described in considerable detail, it is not intended to restrict or in any way limit the scope of the appended claims to such detail. The various features and aspects discussed herein may be used alone or in any combination. The present disclosure is therefore not limited to the specific details, representative apparatus and methods and illustrative examples shown and described. Instead, the present disclosure is intended to cover such alternatives, modifications, and equivalents without departing from the spirit and scope of the application as defined by the appended claims.

What is claimed is:

1. An adapter for connecting a separated-outlet cartridge containing a fluid to a single inlet mixer configured to mix and dispense the fluid, the adapter comprising:
   a fluid outlet port having an outer connection portion configured to be sealingly and releasably coupled to the mixer for directing fluid into the mixer;
   a first fluid inlet port in fluid communication with the fluid outlet port and a second fluid inlet port in fluid communication with the fluid outlet port, wherein the first and second fluid inlet ports are configured to be sealingly coupled to the separated-outlet cartridge for receiving fluid from the cartridge;
   a lock mechanism comprising a base and at least one snap arm extending from the base, the at least one snap arm configured to receive and lockingly snap into engagement with a flange of the cartridge so as to secure the first and second fluid inlet ports to the cartridge; and
   a lock release mechanism comprising a lever extending proximally from the lock mechanism and a peel handle extending radially outwardly from the lever, the lock release mechanism configured to unlock the adapter from the cartridge when the peel handle is pulled toward the fluid outlet port, wherein the lever is angled out and away from the locking mechanism in a fully assembled state.

2. The adapter according to claim 1, wherein the lock mechanism and the lock release mechanism are integrally molded together as a unitary piece.

3. The adapter according to claim 1, wherein the at least one snap arm extends substantially perpendicular to the base when in a locked position and extends obliquely away from the base when in an unlocked position.

4. The adapter according to claim 3, wherein the at least one snap arm comprises a first snap arm and a second snap arm.

5. The adapter according to claim 3, wherein the at least one snap arm comprises a locking notch configured to snap over the flange of the cartridge.

6. The adapter according to claim 5, wherein the at least one snap arm further comprises an inwardly projecting locking tab having an oblique trailing surface configured to abut the flange of the cartridge.

7. The adapter according to claim 6, wherein the locking tab further defines a leading surface that is chamfered or rounded to assist with snapping said locking notch into engagement with the flange of the cartridge.

8. The adapter according to claim 1, wherein the peel handle comprises a gripping surface.

9. The adapter according claim 1, wherein the first and second fluid inlet ports are configured to be coupled to respective first and second fluid outlets of the cartridge for receiving fluid from the cartridge.

10. The adapter according to claim 1, wherein the first fluid inlet port further comprises a first fluid inlet passage and the second fluid inlet port further comprises a second fluid inlet passage, and wherein the fluid outlet port further comprises a first fluid outlet passage and a second fluid outlet passage, such that the first fluid inlet passage is in fluid communication with the first fluid outlet passage, and the second fluid inlet passage is in fluid communication with the second fluid outlet passage.

11. The adapter according to claim 1, wherein the fluid outlet port further comprises a first fluid outlet passage and a second fluid outlet passage separated by a dividing wall.

12. The adapter according to claim 11, wherein the dividing wall is flat.

13. The adapter according to claim 11, wherein the dividing wall is curved.

14. The adapter according to claim 11, wherein the first and second fluid outlet passages have cross-sectional areas that are equal in size for directing equal volumes of respective first and second fluids into the mixer.

15. The adapter according to claim 11, wherein the first and second fluid outlet passages have cross-sectional areas that are unequal in size for directing different volumes of respective first and second fluids into the mixer.

16. The adapter according to claim 1, wherein the outer connection portion comprises an outer sealing surface adapted to provide a fluid tight seal with the mixer.

17. The adapter according to claim 16, wherein the outer connection portion comprises an outer threaded surface configured to engage with an internal threaded surface of the mixer.

18. The adapter according to claim 16, wherein the outer connection portion comprises a press-fit seal.

19. The adapter according to claim 18, wherein the outer connection portion comprises at least one circumferential barb.

20. The adapter according to claim 1, wherein the first and second fluid inlet ports further comprise a press-fit seal.

21. The adapter according to claim 20, wherein the first and second fluid inlet ports further comprise at least one circumferential barb.

* * * * *